US012205611B2

(12) United States Patent
Pedersen et al.

(10) Patent No.: US 12,205,611 B2
(45) Date of Patent: Jan. 21, 2025

(54) HEARING DEVICE COMPRISING AN ADAPTIVE FILTER BANK

(71) Applicant: Oticon A/S, Smørum (DK)

(72) Inventors: Michael Syskind Pedersen, Smørum (DK); Jan M. De Haan, Smørum (DK); Jesper Jensen, Smørum (DK)

(73) Assignee: Oticon A/S, Smørum (DK)

( * ) Notice: Subject to any disclaimer, the term of this patent is extended or adjusted under 35 U.S.C. 154(b) by 287 days.

(21) Appl. No.: 17/841,002

(22) Filed: Jun. 15, 2022

(65) Prior Publication Data

US 2022/0406328 A1 Dec. 22, 2022

(30) Foreign Application Priority Data

Jun. 16, 2021 (EP) .................................... 21179679

(51) Int. Cl.
*G10L 25/30* (2013.01)
*G10L 19/26* (2013.01)
(Continued)

(52) U.S. Cl.
CPC .............. *G10L 25/30* (2013.01); *G10L 19/26* (2013.01); *G10L 21/057* (2013.01); *H04R 25/43* (2013.01);
(Continued)

(58) Field of Classification Search
CPC ....... G10L 19/26; G10L 21/057; G10L 25/30; G10L 2021/0575; H04R 1/10;
(Continued)

(56) References Cited

U.S. PATENT DOCUMENTS 6,104,822 A 8/2000 Melanson et al.
2002/0122562 A1 9/2002 Brennan et al.
(Continued)

OTHER PUBLICATIONS

Extended European Search Report for European Application No. 22179094.2, dated Nov. 11, 2022.
(Continued)

*Primary Examiner* — Harry S Hong
(74) *Attorney, Agent, or Firm* — Birch, Stewart, Kolasch & Birch, LLP

(57) ABSTRACT

A hearing device comprises a) at least one input transducer configured to pick up sound from an acoustic environment around the user when the user is wearing the hearing device, the at least one input transducer providing at least one electric input signal representative of said sound, b) at least one analysis filter bank configured to provide said at least one electric input signal as a multitude of frequency sub-band signals, the at least one analysis filter bank comprising b1) a plurality of M first filters $h_m(n)$, whose impulse responses are modulated from a first prototype filter h(n), where m=0, 1, . . . , M−1 is a frequency band index, and n is a time index, c) a processor for processing said at least one electric input signal provided by said at least one analysis filter bank, or a signal originating therefrom, and providing a processed signal, d) an output transducer configured to provide stimuli perceivable as sound to the user in dependence of said processed signal, and e) a controller for controlling said analysis filter bank by applying a different first prototype filter to said at least one filter bank in dependence of said current acoustic environment. A method of operating a hearing device is further disclosed.

20 Claims, 9 Drawing Sheets

(51) Int. Cl.
*G10L 21/057* (2013.01)
*H04R 25/00* (2006.01)

(52) U.S. Cl.
CPC .. *G10L 2021/0575* (2013.01); *H04R 2225/43* (2013.01); *H04R 2225/61* (2013.01); *H04R 2460/01* (2013.01)

(58) Field of Classification Search
CPC ........ H04R 1/1041; H04R 1/40; H04R 1/406; H04R 3/00; H04R 3/005; H04R 3/02; H04R 25/00; H04R 25/405; H04R 25/407; H04R 25/43; H04R 25/453; H04R 25/505; H04R 25/507; H04R 2225/41; H04R 2225/43; H04R 2225/61; H04R 2460/01
USPC .......................................... 381/23.1, 92, 312
See application file for complete search history.

(56) References Cited

U.S. PATENT DOCUMENTS

| | | | | |
|---|---|---|---|---|
| 2013/0035777 | A1 | 2/2013 | Niemisto et al. | |
| 2017/0295438 | A1 | 10/2017 | De Haan | |
| 2018/0220243 | A1 | 8/2018 | Nielsen | |
| 2020/0322738 | A1 | 10/2020 | Elmedyb et al. | |
| 2021/0274296 | A1 * | 9/2021 | Rohde .................... | H04R 25/30 |

OTHER PUBLICATIONS

European Search Report issued in priority application No. 21179679.2 dated Jan. 4, 2022.

* cited by examiner

HEARING DEVICE COMPRISING AN ADAPTIVE FILTER BANK

TECHNICAL FIELD

The present disclosure relates to hearing devices, e.g. hearing aids or headsets, in particular to and adaptive filter bank and to detection of a current acoustic environment around the hearing device. A detected sound scene may influence processing of the hearing aid or headset.

SUMMARY

The present application relates to the field of hearing aids or headsets, in particular to detection of a current acoustic environment around such devices. The present disclosure proposes a hearing device, e.g. a hearing aid or a headset, comprising an adaptive filter bank (e.g. an analysis filter bank) configured to allow a prototype filter of the filter bank to be changed in dependence of a detected acoustic scene. The hearing device may comprise an acoustic scene detector and/or be configured to receive information about the current acoustic environment of the hearing device from another device.

The 'sound environments' (or 'acoustic environment') may primarily be considered as some specific types of environments. Sound environments may, however, alternatively be interpreted as sound environments on a more continuous scale, e.g. in terms of signal quality, e.g. signal-to-noise ratio (SNR), or input level, or as function of the number of different talkers, etc.

A Hearing Device:

In an aspect of the present application, a hearing device, e.g. a hearing aid or a headset, is provided. The hearing device comprises

- at least one input transducer configured to pick up sound from an acoustic environment around the user when the user is wearing the hearing device, the at least one input transducer providing at least one electric input signal representative of said sound,
- at least one analysis filter bank configured to provide said at least one electric input signal as a multitude of frequency sub-band signals, the at least one analysis filter bank comprising a plurality of M first filters $h_m(n)$, whose impulse responses are modulated from a first prototype filter h(n), where m=0, 1, . . . , M−1 is a frequency band index, and n is a time index,
- a processor for processing said at least one electric input signal provided by said at least one analysis filter bank, or a signal originating therefrom, and providing a processed signal, and
- an output transducer configured to provide stimuli perceivable as sound to the user in dependence of said processed signal.

The hearing aid may further comprise a controller for controlling said analysis filter bank by applying a different first prototype filter to said at least one analysis filter bank in dependence of said current acoustic environment.

Thereby an improved hearing device may be provided.

The analysis filter bank may comprise a number M of first filters generated from the first prototype filter, each of the first filters providing a first filtered signal in dependence of the first prototype filter and the center-frequency associated with the first prototype filter. The first prototype filter may be a linear phase prototype filter. The analysis filter bank may comprise a Fourier transform algorithm (e.g. a Fast Fourier transform algorithm (FFT)) configured to transform each filtered signal to the time frequency domain $x_m(n)$, m and n being frequency and time indices, respectively, and m=1, . . . , M.

The hearing device may comprise a synthesis filter bank. The synthesis filter bank may comprise an Inverse Fourier transform algorithm (e.g. an Inverse Fast Fourier transform algorithm (IFFT)) configured to transform a multitude of (complex) time frequency domain signals $x_m(n)$, m=1, . . . , M to the time domain. The synthesis filter bank may comprise a plurality of M second filters $g_m(n)$, m=0, 1, . . . , M−1, whose impulse responses are modulated from a second (e.g. linear phase) prototype filter g(n). Each of the second filters provides a second filtered signal in dependence of the second prototype filter and the center-frequency associated with second prototype filter.

The plurality of first and second filters may be arranged in pairs, each pair forming a frequency channel (cf. e.g. FIG. 3B).

Parameters defining the different prototype filters may be stored in memory, e.g. of the hearing device. Parameters may be filter coefficients and/or prototype filter coefficients. Also, parameters depending on the prototype filter may be stored in memory (e.g. directional weights).

The hearing device may comprise a sound scene classifier configured to classify the acoustic environment into a number of different sound scene classes, and to provide a current sound scene class in dependence of a current representation, e.g. extracted features, of the at least one electric input signal.

The sound scene classifier may comprise a neural network, e.g. a recurrent neural network.

The sound scene classifier may receive the at least one electric input signal as input. The at least one electric input signal may be provided to the sound scene classifier as a time domain signal (e.g. from the at least on input transducer) and/or as a time-frequency domain signal (e.g. from the at least one analysis filter bank).

The sound scene classifier may receive frequency domain input features, or a combination of time and frequency domain input features, e.g. extracted from the at least one electric input signal. Multi-modal inputs may be provided as inputs to the sound scene analysis—e.g. an accelerometer capable of detecting jaw movements (e.g. to detect own voice(OVD)) or walking, etc., may likewise be provided to the sound scene classifier. The sound scene classifier may be located in the hearing instrument or outside the hearing instrument, e.g. in another hearing device, or in a smartphone or in a smartwatch, or in a dedicated (e.g. portable) processing unit.

The hearing device may comprise a user interface allowing a user to influence functionality of the hearing device, including to allow the user to indicate the current acoustic environment, or to select of a specific program, wherein each selected acoustic environment or program is associated with a specific prototype filter. The user interface may be configured to allow the user to select a specific acoustic environment as a classifier of the acoustic environment (e.g. music, speech in noise, car, cocktail party, etc.). The prototype filter may be different from classifier (or program) to classifier (or program).

The controller may be configured to provide that a fading from one prototype filter to another is initiated when said sound scene classifier or said user changes the classification of the current acoustic environment from one sound scene class to another, e.g., such that the fading between the two filter banks maintain the same phase response. The purpose is to maintain the same group delay (group delay=−d(phase)/ dt). This may be obtained by fading from one prototype filter to another prototype filter, where the two prototype filters have the same group delay (e.g. two symmetric FIR filters with the same length).

The fading time may e.g. be greater than 1 second, such as greater than 5 seconds, or greater than 10 seconds. The fading time, however, alternatively, be instantaneous.

The different prototype filters may be configured to exhibit the same group delay. Thereby, the fading between the two filter banks maintains the same phase response, and the magnitude response changes are negligible. As only the prototype filter is changed, the frequency transformation in the filter banks (such as FFT or IFFT) can be re-used.

Fading between prototype filters may thus be provided without altering the latency of the hearing aid. Further or alternatively, a relatively slow fading may be applied in order to make the fading inaudible (the sound environments often change slowly anyway).

The hearing device may comprise

- at least two input transducers configured to pick up sound from an acoustic environment around the user when the user is wearing the hearing device, the at least two input transducers providing at least two electric input signals representative of said sound,
- a beamformer configured to provide beamformed signal in dependence of said at least two electric input signals and predefined and/or adaptively updated beamformer weights, wherein the beamformer weights are adapted in dependence of the selected prototype filter.

The prototype filter may be selected in dependence of a current acoustic environment. So, the beamformer weights of the beamformer may be adapted in dependence of a current acoustic environment. It may be that the same prototype filter is selected for different sound scene classes (but not for all classes).

The hearing device may comprise an analysis filter bank for each one of the at least two input transducers. Hence, the hearing device comprising at least two input transducers comprises at least two analysis filter banks. The at least two analysis filter banks having different prototype filters in different acoustic environments may be running in parallel such that (at least some of) the different parameters in the hearing instrument depending on the filter bank parameters (e.g. low-pass filtered coefficients) can quickly be adapted, cf. e.g. FIG. 6.

Filter bank parameters may be changed based on the behavior of the hearing aid user, e.g. based on whether the person is moving, whether the person is having a conversation, e.g. based on the amount of time the person is talking (e.g. the amount of time the person has been talking during the past minute, the past five minutes or during the past 10 minutes). Filter bank parameters may include delay (e.g. delay of prototype filters of the filter bank), band width of the frequency bands, number of frequency bands, filter lengths, etc.

The hearing device may comprise an adaptive feedback control system comprising an adaptive algorithm for estimating a feedback path from said output transducer to said at least one input transducer, and wherein the hearing device is configured to control the adaptation rate of the adaptive algorithm in dependence of a change of the current acoustic environment. The adaptation rate of the adaptive algorithm may be temporarily increased when the prototype filter of an analysis filter bank is changed.

The hearing device may be configured to provide that at least one of the prototype filters is dependent on a hearing loss of the user. It may be advantageous to have less stopband attenuation and a narrower main lobe for a user with a 'flat' hearing loss (little variation over frequency). It may be advantageous to have more stop-band attenuation and a broader main lobe with more overlap between the neighboring bands for a 'ski slope' hearing losses (little loss at low frequency and high loss at high frequency). It could be individualized even when the prototype filter does not change across sound scenes.

The term 'sound scene' may be defined in a broad sense to describe an acoustic situation around the user/hearing device. A sound scene may e.g. be defined by an average sound pressure level (e.g. silent, moderate or loud) or its signal to noise ratio (e.g. speech in silence or speech in noise, etc.). Two sound scenes may be interpreted as being different if their (e.g. average, e.g. measured) levels are sufficiently different (e.g. larger than a predefined threshold), or if their levels are in specific predefined level ranges (e.g. in dB). Likewise, two sound scenes may be interpreted as being different if their (e.g. average, e.g. measured) signal-to-noise-ratios are sufficiently different (e.g. larger than a predefined threshold), or if their SNR-values are in specific predefined ranges (e.g. in dB).

The hearing device may be configured to provide that a specific sound scene is dependent on a measured sound level, a measured signal-to-noise ratio, a measured speech intelligibility estimate, a measured sound quality estimate, a specific sound scene or a combination thereof.

The adaptation between different prototype filters is thereby dependent on the mentioned parameters.

The hearing device may be adapted for being located at or in an ear of a user, or for being at least partially implanted in the head at an ear of the user.

The hearing device may be constituted by or comprise an air-conduction type hearing aid, a bone-conduction type hearing aid, a cochlear implant type hearing aid, or a combination thereof.

In case of a cochlear implant type hearing aid, the filter bank may only comprise one or more analysis filter banks, because electric stimuli of the cochlear nerve are determined from the frequency sub-band signals (so that no conversion from time-frequency domain to time-domain is performed in the hearing aid).

The hearing aid may be adapted to provide a frequency dependent gain and/or a level dependent compression and/or a transposition (with or without frequency compression) of one or more frequency ranges to one or more other frequency ranges, e.g. to compensate for a hearing impairment of a user. The hearing aid may comprise a signal processor for enhancing the input signals and providing a processed output signal.

The hearing aid may comprise an output unit for providing a stimulus perceived by the user as an acoustic signal based on a processed electric signal. The output unit may comprise a number of electrodes of a cochlear implant (for a CI type hearing aid) or a vibrator of a bone conducting hearing aid. The output unit may comprise an output transducer. The output transducer may comprise a receiver (loudspeaker) for providing the stimulus as an acoustic signal to the user (e.g. in an acoustic (air conduction based) hearing aid). The output transducer may comprise a vibrator for providing the stimulus as mechanical vibration of a skull bone to the user (e.g. in a bone-attached or bone-anchored hearing aid).

The hearing aid may comprise an input unit for providing an electric input signal representing sound. The input unit may comprise an input transducer, e.g. a microphone, for converting an input sound to an electric input signal. The input unit may comprise a wireless receiver for receiving a wireless signal comprising or representing sound and for providing an electric input signal representing said sound. The wireless receiver may e.g. be configured to receive an electromagnetic signal in the radio frequency range (3 kHz to 300 GHz). The wireless receiver may e.g. be configured to receive an electromagnetic signal in a frequency range of light (e.g. infrared light 300 GHz to 430 THz, or visible light, e.g. 430 THz to 770 THz).

The hearing aid may comprise a directional microphone system adapted to spatially filter sounds from the environment, and thereby enhance a target acoustic source among a multitude of acoustic sources in the local environment of the user wearing the hearing aid. The directional system may be adapted to detect (such as adaptively detect) from which direction a particular part of the microphone signal originates. This can be achieved in various different ways as e.g. described in the prior art. In hearing aids, a microphone array beamformer is often used for spatially attenuating background noise sources. Many beamformer variants can be found in literature. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form.

The hearing aid may comprise antenna and transceiver circuitry allowing a wireless link to an entertainment device (e.g. a TV-set), a communication device (e.g. a telephone), a wireless microphone, or another hearing aid, etc. The hearing aid may thus be configured to wirelessly receive a direct electric input signal from another device. Likewise, the hearing aid may be configured to wirelessly transmit a direct electric output signal to another device. The direct electric input or output signal may represent or comprise an audio signal and/or a control signal and/or an information signal.

In general, a wireless link established by antenna and transceiver circuitry of the hearing aid can be of any type. The wireless link may be a link based on near-field communication, e.g. an inductive link based on an inductive coupling between antenna coils of transmitter and receiver parts. The wireless link may be based on far-field, electromagnetic radiation. Preferably, frequencies used to establish a communication link between the hearing aid and the other device is below 70 GHz, e.g. located in a range from 50 MHz to 70 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). The wireless link may be based on a standardized or proprietary technology. The wireless link may be based on Bluetooth technology (e.g. Bluetooth Low-Energy technology), or Ultra WideBand (UWB) technology.

The hearing aid may be or form part of a portable (i.e. configured to be wearable) device, e.g. a device comprising a local energy source, e.g. a battery, e.g. a rechargeable battery. The hearing aid may e.g. be a low weight, easily wearable, device, e.g. having a total weight less than 300 g, e.g. less than 100 g, such as less than 20 g, e.g. less than 10 g.

The hearing aid may comprise a 'forward' (or 'signal') path for processing an audio signal between an input and an output of the hearing aid. A signal processor may be located in the forward path. The signal processor may be adapted to provide a frequency dependent gain according to a user's particular needs (e.g. hearing impairment). The hearing aid may comprise an 'analysis' path comprising functional components for analyzing signals and/or controlling processing of the forward path. Some or all signal processing of the analysis path and/or the forward path may be conducted in the frequency domain, in which case the hearing aid comprises appropriate analysis and synthesis filter banks. Some or all signal processing of the analysis path and/or the forward path may be conducted in the time domain.

An analogue electric signal representing an acoustic signal may be converted to a digital audio signal in an analogue-to-digital (AD) conversion process, where the analogue signal is sampled with a predefined sampling frequency or rate $f_s$, $f_s$ being e.g. in the range from 8 kHz to 48 kHz (adapted to the particular needs of the application) to provide digital samples $x_n$ (or x[n]) at discrete points in time $t_n$ (or n), each audio sample representing the value of the acoustic signal at $t_n$ by a predefined number $N_b$ of bits, $N_b$ being e.g. in the range from 1 to 48 bits, e.g. 24 bits. Each audio sample is hence quantized using $N_b$ bits (resulting in $2^{Nb}$ different possible values of the audio sample). A digital sample x has a length in time of $1/f_s$ e.g. 50 μs, for $f_s$=20 kHz. A number of audio samples may be arranged in a time frame. A time frame may comprise 64 or 128 audio data samples. Other frame lengths may be used depending on the practical application.

The hearing aid may comprise an analogue-to-digital (AD) converter to digitize an analogue input (e.g. from an input transducer, such as a microphone) with a predefined sampling rate, e.g. 20 kHz. The hearing aids may comprise a digital-to-analogue (DA) converter to convert a digital signal to an analogue output signal, e.g. for being presented to a user via an output transducer.

The hearing aid, e.g. the input unit, and or the antenna and transceiver circuitry may comprise a transform unit for converting a time domain signal to a signal in the transform domain (e g frequency domain or Laplace domain, etc.). The transform unit may be constituted by or comprise a TF-conversion unit for providing a time-frequency representation of an input signal. The time-frequency representation may comprise an array or map of corresponding complex or real values of the signal in question in a particular time and frequency range. The TF conversion unit may comprise a filter bank for filtering a (time varying) input signal and providing a number of (time varying) output signals each comprising a distinct frequency range of the input signal. The TF conversion unit may comprise a Fourier transformation unit (e.g. a Discrete Fourier Transform (DFT) algorithm, or a Short Time Fourier Transform (STFT) algorithm, or similar) for converting a time variant input signal to a (time variant) signal in the (time-)frequency domain. The frequency range considered by the hearing aid from a minimum frequency $f_{min}$ to a maximum frequency $f_{max}$ may comprise a part of the typical human audible frequency range from 20 Hz to 20 kHz, e.g. a part of the range from 20 Hz to 12 kHz. Typically, a sample rate $f_s$ is larger than or equal to twice the maximum frequency $f_{max}$, $f_s \geq 2f_{max}$. A signal of the forward and/or analysis path of the hearing aid may be split into a number NI of frequency bands (e.g. of uniform width), where NI is e.g. larger than 5, such as larger than 10, such as larger than 50, such as larger than 100, such as larger than 500, at least some of which are processed individually. The hearing aid may be adapted to process a signal of the forward and/or analysis path in a number NP of different frequency channels (NP≤NI). The frequency channels may be uniform or non-uniform in width (e.g. increasing in width with frequency), overlapping or non-overlapping.

The hearing aid may be configured to operate in different modes, e.g. a normal mode and one or more specific modes, e.g. selectable by a user, or automatically selectable. A mode of operation may be optimized to a specific acoustic situation or environment. A mode of operation may include a low-power mode, where functionality of the hearing aid is reduced (e.g. to save power), e.g. to disable wireless communication, and/or to disable specific features of the hearing aid.

The hearing aid may comprise a number of detectors configured to provide status signals relating to a current physical environment of the hearing aid (e.g. the current acoustic environment), and/or to a current state of the user wearing the hearing aid, and/or to a current state or mode of operation of the hearing aid. Alternatively or additionally, one or more detectors may form part of an external device in communication (e.g. wirelessly) with the hearing aid. An external device may e.g. comprise another hearing aid, a remote control, and audio delivery device, a telephone (e.g. a smartphone), an external sensor, etc.

One or more of the number of detectors may operate on the full band signal (time domain) One or more of the number of detectors may operate on band split signals ((time-) frequency domain), e.g. in a limited number of frequency bands.

The number of detectors may comprise a level detector for estimating a current level of a signal of the forward path. The detector may be configured to decide whether the current level of a signal of the forward path is above or below a given (L-)threshold value. The level detector operates on the full band signal (time domain) The level detector operates on band split signals ((time-) frequency domain).

The hearing aid may comprise a voice activity detector (VAD) for estimating whether or not (or with what probability) an input signal comprises a voice signal (at a given point in time). A voice signal may in the present context be taken to include a speech signal from a human being. It may also include other forms of utterances generated by the human speech system (e.g. singing). The voice activity detector unit may be adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). The voice activity detector may be adapted to detect as a VOICE also the user's own voice. Alternatively, the voice activity detector may be adapted to exclude a user's own voice from the detection of a VOICE.

The hearing aid may comprise an own voice detector for estimating whether or not (or with what probability) a given input sound (e.g. a voice, e.g. speech) originates from the voice of the user of the system. A microphone system of the hearing aid may be adapted to be able to differentiate between a user's own voice and another person's voice and possibly from NON-voice sounds.

The number of detectors may comprise a movement detector, e.g. an acceleration sensor. The movement detector may be configured to detect movement of the user's facial muscles and/or bones, e.g. due to speech or chewing (e.g. jaw movement) and to provide a detector signal indicative thereof.

The hearing aid may comprise a classification unit configured to classify the current situation based on input signals from (at least some of) the detectors, and possibly other inputs as well. In the present context 'a current situation' may be taken to be defined by one or more of a) the physical environment (e.g. including the current electromagnetic environment, e.g. the occurrence of electromagnetic signals (e.g. comprising audio and/or control signals) intended or not intended for reception by the hearing aid, or other properties of the current environment than acoustic);
b) the current acoustic situation (input level, feedback, etc.), and
c) the current mode or state of the user (movement, temperature, cognitive load, etc.);
d) the current mode or state of the hearing aid (program selected, time elapsed since last user interaction, etc.) and/or of another device in communication with the hearing aid.

The classification unit may be based on or comprise a neural network, e.g. a trained neural network.

The hearing aid may comprise an acoustic (and/or mechanical) feedback control (e.g. suppression) or echo-cancelling system. Adaptive feedback cancellation has the ability to track feedback path changes over time. It is typically based on a linear time invariant filter to estimate the feedback path but its filter weights are updated over time. The filter update may be calculated using stochastic gradient algorithms, including some form of the Least Mean Square (LMS) or the Normalized LMS (NLMS) algorithms. They both have the property to minimize the error signal in the mean square sense with the NLMS additionally normalizing the filter update with respect to the squared Euclidean norm of some reference signal.

The hearing aid may further comprise other relevant functionality for the application in question, e.g. compression, noise reduction, etc.

The hearing aid may comprise a hearing instrument, e.g. a hearing instrument adapted for being located at the ear or fully or partially in the ear canal of a user, e.g. a headset, an earphone, an ear protection device or a combination thereof. A hearing system may comprise a speakerphone (comprising a number of input transducers and a number of output transducers, e.g. for use in an audio conference situation), e.g. comprising a beamformer filtering unit, e.g. providing multiple beamforming capabilities.

Use:

In an aspect, use of a hearing device, e.g. a hearing aid, as described above, in the 'detailed description of embodiments' and in the claims, is moreover provided. Use may be provided in a system comprising one or more hearing devices, e.g. hearing aids (e.g. hearing instruments), headsets, ear phones, active ear protection systems, etc., e.g. in handsfree telephone systems, teleconferencing systems (e.g. including a speakerphone), public address systems, karaoke systems, classroom amplification systems, etc.

A method:

In an aspect, a method of operating a hearing device, e.g. a hearing aid, adapted for being located at or in an ear of a user, or for being at least partially implanted in the head at an ear of the user, is furthermore provided by the present application. The method comprises providing at least one electric input signal representative of sound from an acoustic environment around the user when the user is wearing the hearing device, providing said at least one electric input signal as a multitude of frequency sub-band signals, using a plurality of M first filters $h_m(n)$, where m=0, 1, . . . , M−1 is a frequency band index, and whose impulse responses are modulated from a first prototype filter h(n), n being a time index, processing said at least one electric input signal, or a signal originating therefrom, and providing a processed signal, and providing stimuli perceivable as sound to the user in dependence of said processed signal.

The method may further comprise that the step of providing said at least one electric input signal as a multitude of frequency sub-band signals comprises applying a different first prototype filter in dependence of said current acoustic environment.

It is intended that some or all of the structural features of the device described above, in the 'detailed description of embodiments' or in the claims can be combined with embodiments of the method, when appropriately substituted by a corresponding process and vice versa. Embodiments of the method have the same advantages as the corresponding devices.

The method may comprise the step of classifying the acoustic environment into a number of different sound scene classes, and providing a current sound scene class in dependence of a current representation, e.g. extracted features, of the at least one electric input signal A Computer Readable Medium or Data Carrier:

In an aspect, a tangible computer-readable medium (a data carrier) storing a computer program comprising program code means (instructions) for causing a data processing system (a computer) to perform (carry out) at least some (such as a majority or all) of the (steps of the) method described above, in the 'detailed description of embodiments' and in the claims, when said computer program is executed on the data processing system is furthermore provided by the present application.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Other storage media include storage in DNA (e.g. in synthesized DNA strands). Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium.

A Computer Program:

A computer program (product) comprising instructions which, when the program is executed by a computer, cause the computer to carry out (steps of) the method described above, in the 'detailed description of embodiments' and in the claims is furthermore provided by the present application.

A Data Processing System:

In an aspect, a data processing system comprising a processor and program code means for causing the processor to perform at least some (such as a majority or all) of the steps of the method described above, in the 'detailed description of embodiments' and in the claims is furthermore provided by the present application.

A Hearing System:

In a further aspect, a hearing system comprising a hearing aid as described above, in the 'detailed description of embodiments', and in the claims, AND an auxiliary device is moreover provided.

The hearing system may be adapted to establish a communication link between the hearing aid and the auxiliary device to provide that information (e.g. control and status signals, possibly audio signals) can be exchanged or forwarded from one to the other.

The auxiliary device may comprise a remote control, a smartphone, or other portable or wearable electronic device, such as a smartwatch or the like.

The auxiliary device may be constituted by or comprise a remote control for controlling functionality and operation of the hearing aid(s). The function of a remote control may be implemented in a smartphone, the smartphone possibly running an APP allowing to control the functionality of the audio processing device via the smartphone (the hearing aid(s) comprising an appropriate wireless interface to the smartphone, e.g. based on Bluetooth or some other standardized or proprietary scheme).

The auxiliary device may be constituted by or comprise an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing aid.

The auxiliary device may be adapted to run an application program, termed an APP, comprising executable instructions configured to be executed on the auxiliary device (e.g. a smartphone) to implement a user interface for the hearing device (or hearing system). The APP is configured to exchange data with the hearing device(s).

The auxiliary device may be constituted by or comprise another hearing aid. The hearing system may comprise two hearing aids adapted to implement a binaural hearing system, e.g. a binaural hearing aid system.

The hearing system may be configured to change both prototype filters (of the first and second hearing aids of the binaural hearing aid system) simultaneously.

An APP:

In a further aspect, a non-transitory application, termed an APP, is furthermore provided by the present disclosure. The APP comprises executable instructions configured to be executed on an auxiliary device to implement a user interface for a hearing aid or a hearing system described above in the 'detailed description of embodiments', and in the claims. The APP may be configured to run on cellular phone, e.g. a smartphone, or on another portable device allowing communication with said hearing aid or said hearing system.

The application program (APP) may be configured to allow a user select a mode of operation of the hearing aid or hearing aid system via selectable options. Further, current status information may be displayed via the APP.

The APP may be adapted to allow the user to configure features of a sound scene classifier in the user's hearing aid or hearing aid system for use in an adaptive filter bank according to the present disclosure. Via the user interface, the user can accept an 'Automatically detected sound scene' (e.g. provided by sound scene detection unit, of the hearing aid system). Alternatively, the user is able to manually override the automatically detected sound scene, by a 'Manual classification' option, wherein a number of manually selectable sound scene classifications are listed (for which different prototype filters for the filter bank are available).

Definitions

In the present context, a hearing aid, e.g. a hearing instrument, refers to a device, which is adapted to improve, augment and/or protect the hearing capability of a user by receiving acoustic signals from the user's surroundings, generating corresponding audio signals, possibly modifying the audio signals and providing the possibly modified audio signals as audible signals to at least one of the user's ears. Such audible signals may e.g. be provided in the form of acoustic signals radiated into the user's outer ears, acoustic signals transferred as mechanical vibrations to the user's inner ears through the bone structure of the user's head and/or through parts of the middle ear as well as electric signals transferred directly or indirectly to the cochlear nerve of the user.

The hearing aid may be configured to be worn in any known way, e.g. as a unit arranged behind the ear with a tube leading radiated acoustic signals into the ear canal or with an output transducer, e.g. a loudspeaker, arranged close to or in the ear canal, as a unit entirely or partly arranged in the pinna and/or in the ear canal, as a unit, e.g. a vibrator, attached to a fixture implanted into the skull bone, as an attachable, or entirely or partly implanted, unit, etc. The hearing aid may comprise a single unit or several units communicating (e.g. acoustically, electrically or optically) with each other. The loudspeaker may be arranged in a housing together with other components of the hearing aid, or may be an external unit in itself (possibly in combination with a flexible guiding element, e.g. a dome-like element).

A hearing aid may be adapted to a particular user's needs, e.g. a hearing impairment. A configurable signal processing circuit of the hearing aid may be adapted to apply a frequency and level dependent compressive amplification of an input signal. A customized frequency and level dependent gain (amplification or compression) may be determined in a fitting process by a fitting system based on a user's hearing data, e.g. an audiogram, using a fitting rationale (e.g. adapted to speech). The frequency and level dependent gain may e.g. be embodied in processing parameters, e.g. uploaded to the hearing aid via an interface to a programming device (fitting system), and used by a processing algorithm executed by the configurable signal processing circuit of the hearing aid.

A 'hearing system' refers to a system comprising one or two hearing aids, and a 'binaural hearing system' refers to a system comprising two hearing aids and being adapted to cooperatively provide audible signals to both of the user's ears. Hearing systems or binaural hearing systems may further comprise one or more 'auxiliary devices', which communicate with the hearing aid(s) and affect and/or benefit from the function of the hearing aid(s). Such auxiliary devices may include at least one of a remote control, a remote microphone, an audio gateway device, an entertainment device, e.g. a music player, a wireless communication device, e.g. a mobile phone (such as a smartphone) or a tablet or another device, e.g. comprising a graphical interface. Hearing aids, hearing systems or binaural hearing systems may e.g. be used for compensating for a hearing-impaired person's loss of hearing capability, augmenting or protecting a normal-hearing person's hearing capability and/or conveying electronic audio signals to a person. Hearing aids or hearing systems may e.g. form part of or interact with public-address systems, active ear protection systems, handsfree telephone systems, car audio systems, entertainment (e.g. TV, music playing or karaoke) systems, teleconferencing systems, classroom amplification systems, etc.

Embodiments of the disclosure may e.g. be useful in applications such as hearing aids, headsets, ear buds, etc.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present application relates to the field of hearing aids or headsets, in particular to detection of a current acoustic environment around the hearing aid. The present disclosure proposes to change a prototype filter of a filter bank in dependence of a detected acoustic scene.

Figure 1:
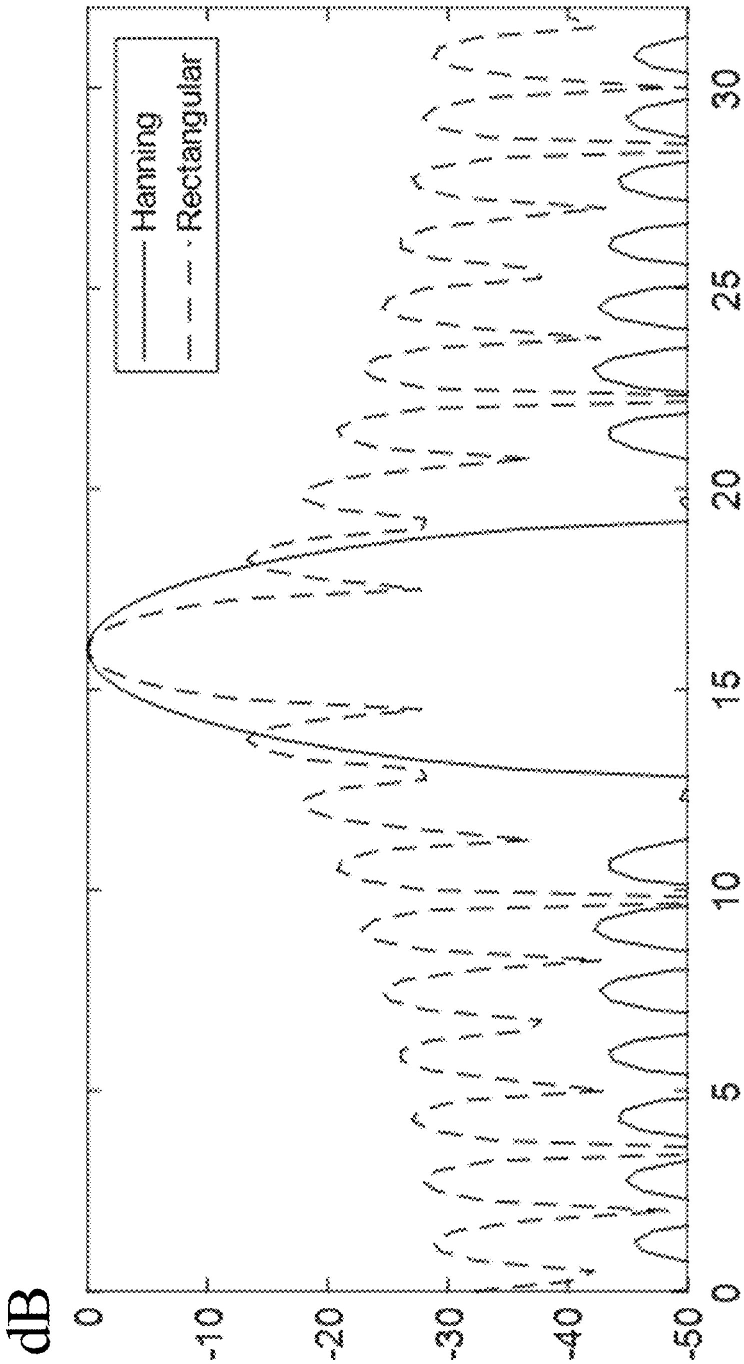
FIG. 1 shows a frequency response of two different prototype filters exemplified by a Hamming prototype filter and a rectangular prototype filter.
Figure 2:
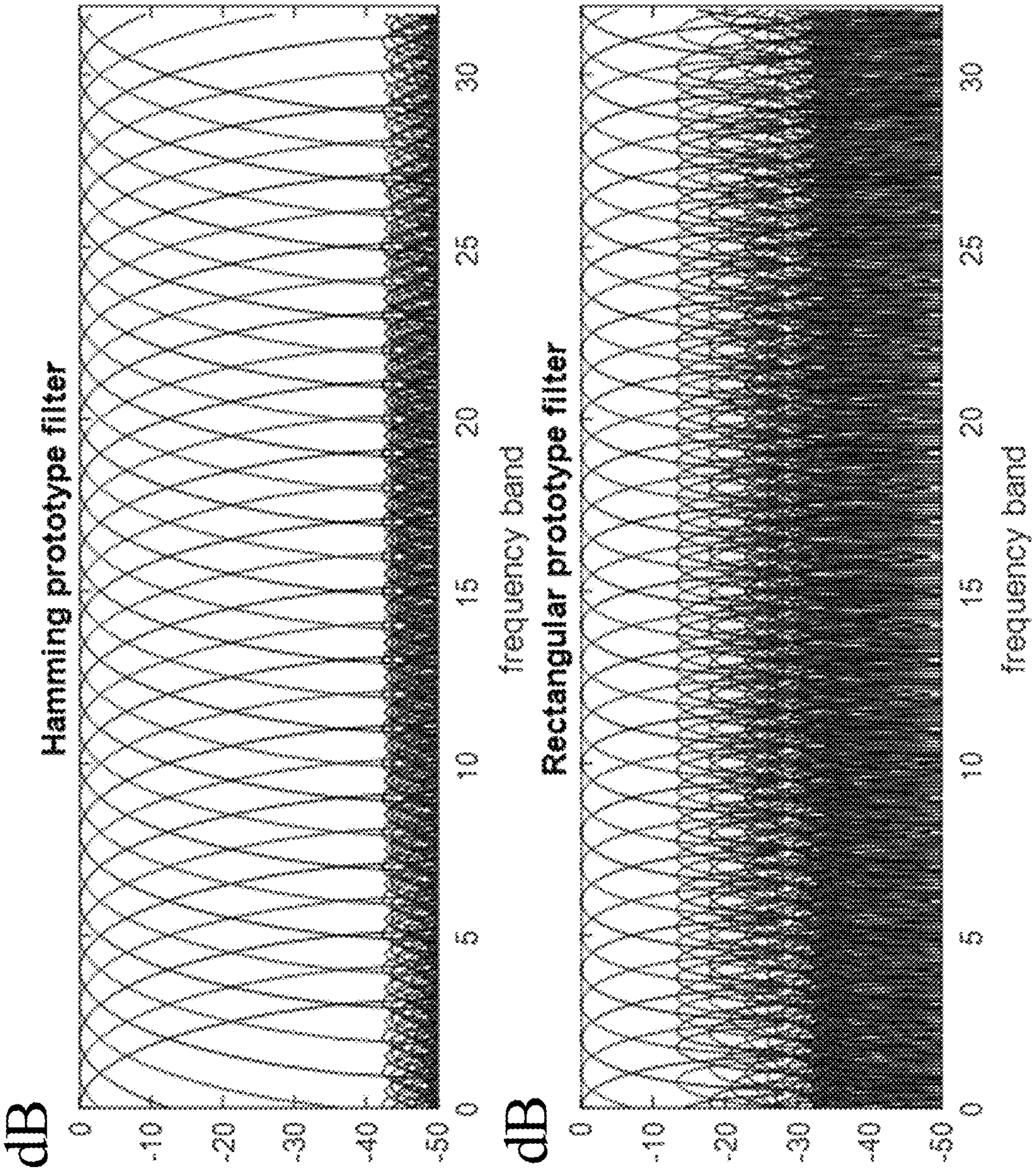
FIG. 2 shows a filter bank with the prototype filter replicated at each centre frequency.
Figure 3A:
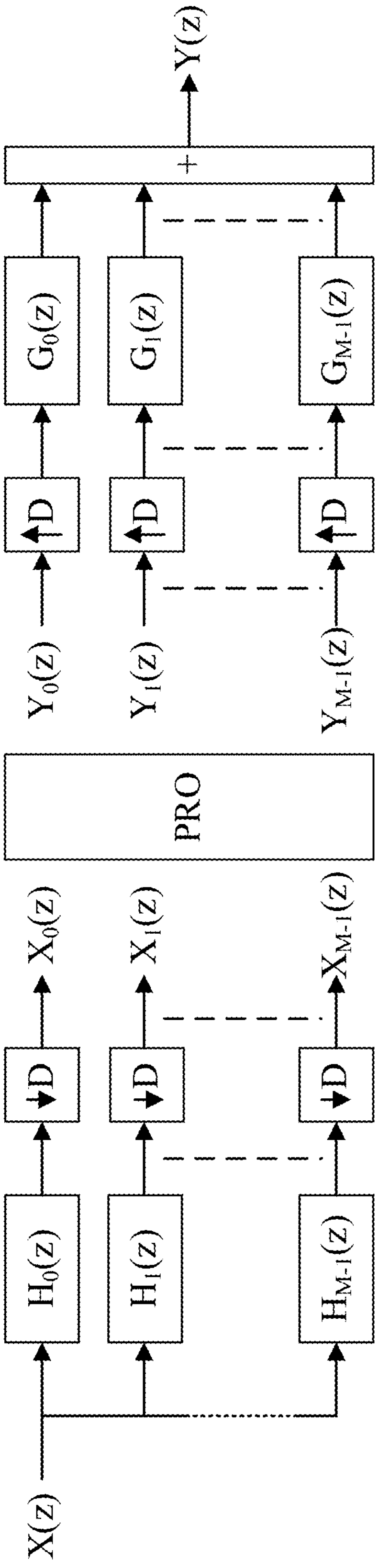
FIG. 3A shows a first example of an implementation of an analysis filter bank and a synthesis filter bank having an analysis prototype and a synthesis prototype filter.
Figure 3B:
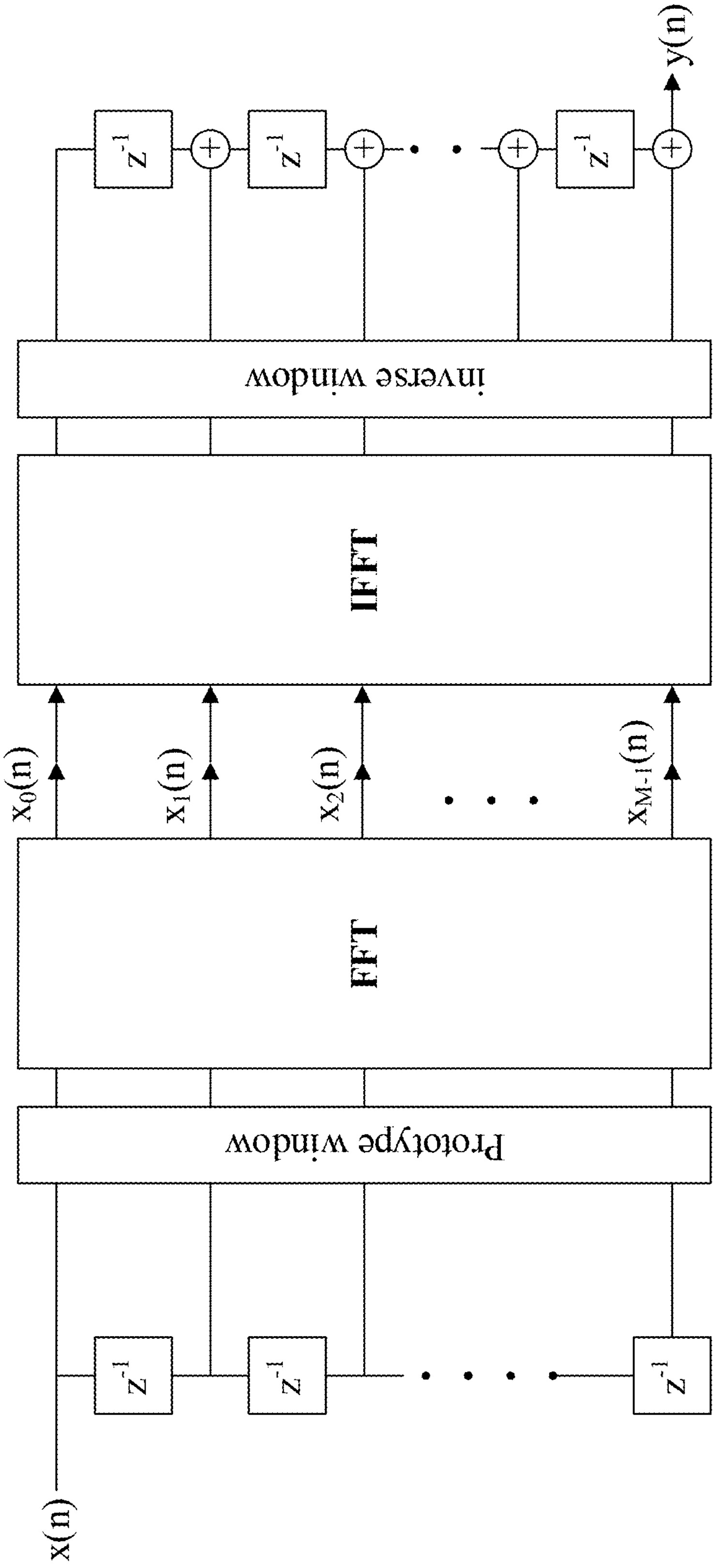
FIG. 3B shows a second example of an implementation of an analysis filter bank and a synthesis filter bank having an analysis prototype and a synthesis prototype filter.

In hearing aids (or other audio processing devices, e.g. headsets), audio signals are typically divided into frequency channels in order to allow frequency dependent processing, such as hearing loss compensation, and/or beamforming-noise reduction. Hearing loss compensation may e.g. require significant gain differences between high and low frequencies. And a high stop-band attenuation is thus required in the filter bank. A prototype filter with a high stop-band attenuation will however typically have a quite broad main lobe resulting in more overlap between the neighbouring frequency bands. This is illustrated in FIG. 1 and FIG. 2. FIGS. 3A and 3B show respective examples of an implementation of an analysis filter bank (and synthesis filter bank) using prototype filters in a signal processing chain consisting of an analysis and a synthesis filter bank. It is important to notice that e.g. hearing aid applications have a limited amount of allowed latency (e.g. <10 ms) for processing an audio signal in a forward path from the microphone through the analysis and the synthesis filter banks before presenting the processed signal to the listener (e.g. via an output transducer). It is thus not an attractive option to increase the processing delay in order to achieve both high frequency resolution and a high stop-band attenuation at the same time.

Today, prototype filters are selected in order to fulfil a specific purpose. Hereby the prototype filter may be less optimal for other purposes. In the present disclosure, it is proposed to solve the problem by having an adaptive prototype filter which can change the prototype filter based on the specific situation, e.g. the acoustic environment.

FIG. 1 shows a frequency response of two different prototype filters exemplified by a Hamming prototype filter and a rectangular prototype filter. The magnitude response illustrates the amplification (0 to −50 dB) of the prototype filter around a centre frequency of the filter (located at frequency band 16 on the horizontal (frequency band) axis (here 32 bands in total)). It can be noticed that the Hamming prototype filter (solid line graph) has a much higher stop band attenuation (i.e. attenuation at other frequencies than the main lobe) compared to the rectangular prototype filter (dashed line graph). On the other hand, the rectangular prototype has a narrower main lobe, allowing better attenuation in the neighbouring frequency bands.

FIG. 2 shows a filter bank with the prototype filter replicated at each centre frequency of the available frequency channels. The vertical axis shows amplification between 0 and −50 dB. The horizontal axis is a frequency axis showing 32 uniform frequency channels. It can be seen that the Hamming window (top graph) has a higher stop-band attenuation compared to a rectangular prototype filter. On the other hand, the main lobe of the Hamming prototype filter is broader compared to the main lobe of the rectangular filter. The rectangular filter (bottom graph) will thus be more efficient at altering the gain of a single band where the effects of the neighbouring bands are less noticeable.

FIG. 3A shows a first example of an implementation of an analysis filter bank and a synthesis filter bank having an analysis prototype and a synthesis prototype filter. FIG. 3A shows a general illustration of a filter bank comprising an analysis filter bank (left part of FIG. 3A) and a synthesis filter bank (right part of FIG. 3A) (and an optional processing unit therebetween). The analysis filter bank comprises M filters $H_m(z)$ ($h_m(n)$ in the time domain, n), m=0, 1, . . . , M−1, which converts a time variant input signal X(z) comprising an audio signal into M time variant frequency band signals, each of which are (optionally) down-sampled with a down-sampling rate D to provide M time variant frequency band signals $X_m(z)$, m=0, 1, . . . , M−1, each representing a sub-band of the total frequency range of the input signal X(z). The M filters $H_m(z)$ of the analysis filter bank are generated from a (first) prototype filter h(n), by modulating the input signal $$h_m(n) = h(n)e^{\frac{j2\pi m(n-\tau_h)}{M}}$$

where h is the prototype filter and $\tau_h$ is the prototype filter delay of h.

Between the output of the analysis filter bank and the inputs of the synthesis filter bank, a signal processing unit (PRO) is shown (not forming part of the filter bank). The signal processing unit (PRO) may be configured to process the M time variant frequency band signals $X_m(z)$ and provide M processed time variant frequency band signals $Y_m(z)$ (e.g. to apply one or more (frequency dependent) signal processing algorithms to the input signals $X_m(z)$ (or signals derived therefrom). The synthesis filter bank (optionally) comprises M up-sampling units for up-sampling (processed) time variant frequency band signals $Y_m(z)$, m=0, 1, . . . , M−1, and M filters $G_m(z)$ (or $g_m(n)$ in the time domain) for converting the M up-sampled (processed) time variant frequency band signals to M (processed) filtered signals and a (delay-and-)sum unit (+) for providing a resulting time variant output signal Y(z) representing the audio signal or a processed version thereof (e.g. having been subject to spatial filtering and/or level and/or frequency dependent shaping, e.g. to compensate for a hearing impairment of a user). The M filters $G_m(z)$ of the synthesis filter bank are generated from a (second) prototype filter g(n):

$$g_m(n) \propto g(n)e^{\frac{j2\pi m(n-\tau_g)}{M}}$$

where g is the prototype filter and $\tau_g$ is the prototype filter delay of g.

It is noted that the above is one way of transforming the signal to the Fourier domain. Other methods exist. More details may be found in the literature, e.g. in textbook [Vaidyanathan; 1993].

FIG. 3B shows a second example of an implementation of an analysis filter bank comprising an analysis prototype and a synthesis prototype filter. The analysis filter bank is represented by the left part of FIG. 3B including delay elements '$z^{-1}$', 'Prototype window' and 'FFT' unit. The analysis filter bank is configured to a time variant input signal x(n) comprising an audio signal into M time variant frequency band signals, $x_0(n)$, . . . , $x_{M-1}(n)$ (i.e. $x_m(n)$, m=0, 1, . . . , M−1). The synthesis filter bank is represented by the right part of FIG. 3B including 'IFFT' unit, 'inverse window', and sum and delay elements '+' and 'z'). The synthesis filter bank is configured to convert M time variant frequency band signals $x_m(n)$, m=0, 1, . . . , M−1, to a resulting time variant output signal y(n) representing the audio signal. The prototype filters of the analysis filter bank form part of the 'Prototype window'. The prototype filters of the synthesis filter bank form part of the 'inverse window'. In the analysis filter bank, the signals from the prototype filters converted to the time-frequency domain by a Fast Fourier transform algorithm (FFT), e.g. Discrete Fourier Transform (DFT) algorithm, or a Short Time Fourier Transform (STFT) algorithm, etc. (e.g. using matrix-multiplication with a modulation sequence). The matrix multiplications can in turn be implemented efficiently using a mapping procedure and the Fast Fourier Transform. Appropriate processing of the audio signal in the time-frequency domain ($x_m(n)$, m=0, 1, . . . , M−1) (cf. FIG. 3A) may be applied between the analysis and synthesis filter banks.

The number of frequency bands M may e.g. be larger than or equal to three, e.g. larger than or equal to 16.

Consider two situations for a hearing impaired person:

1) A quiet situation with a single talker. In this situation it is important to ensure audibility by applying a frequency-dependent amplification to the microphone signal. As the amplification scheme typically involves compression, low-intensity (softer) sounds will be amplified more than louder sounds.
2) A noisy situation with a single talker of interest. In order to ensure audibility of the signal of interest, the signal of interest not only has to be amplified, the background noise should as well be attenuated. As the sound environment is (typically) louder in such situation, typically less amplification is needed.

In the first case, a filter bank with a prototype filter having a high amount of stop-band attenuation is required. In the second case, a filter bank capable of extracting parts of a speech signal in a frequency channel with noisy neighboring channels is needed. We thus have two different auditory scenes, which could benefit from different types of prototype filters.

Figure 4A:
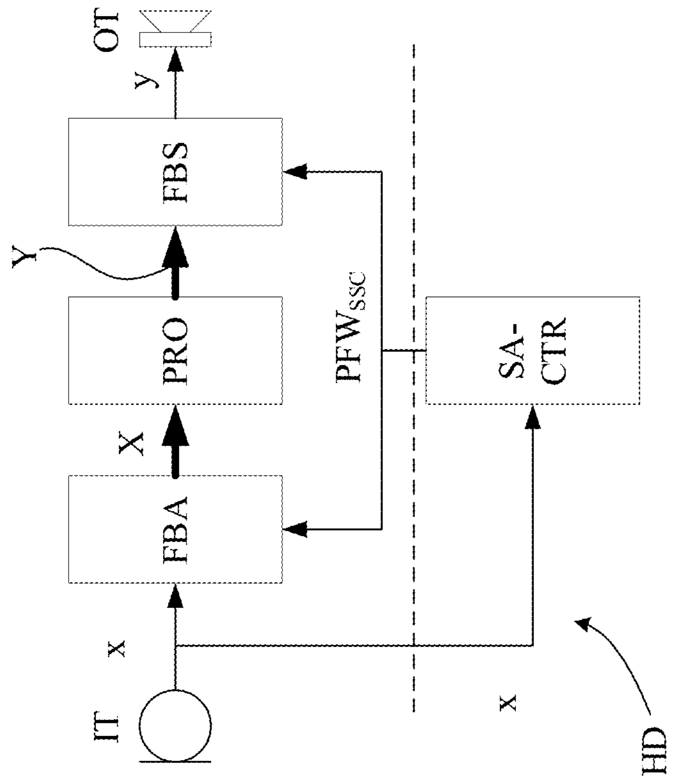
FIG. 4A shows a first exemplary implementation of a hearing instrument with adaptive prototype analysis and synthesis filters.
Figure 4B:
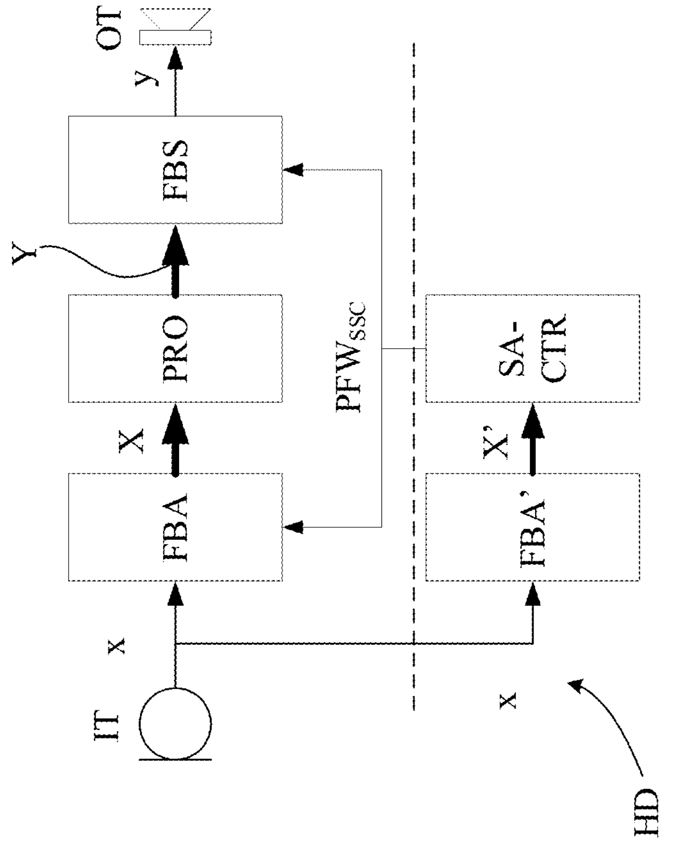
FIG. 4B shows a second exemplary implementation of a hearing instrument with adaptive prototype analysis and synthesis filters.

FIGS. 4A and 4B both illustrate a hearing instrument comprising a forward audio processing path for processing the audio signal in a time-frequency domain. The forward path from input transducer (IT), here comprising a microphone, to output transducer (OT), here comprising a loudspeaker, comprises a filter bank (FBA, FBS) comprising an adaptive analysis and synthesis prototype filter according to the present disclosure, and a signal processing unit (PRO), located between the analysis and synthesis filter banks. The signal processing unit (PR) is configured to apply one or more signal processing algorithms to an audio signal (X) of the forward path in a time-frequency domain and to provide a processed signal (Y). The input transducer (IT) is configured to pick up sound from an acoustic environment around the user when the user is wearing the hearing device, and to provide an electric (time domain) input signal (x) representative of said environment sound. The analysis filter bank (FBA) is configured to convert the time domain electric input signal (x) comprising an audio signal into a multitude of time variant frequency band signals (X). The synthesis filter bank is configured to convert the multitude of time variant (processed) frequency band signals (Y) to a time domain electric input signal (y) comprising a processed version of the audio signal. The output transducer (OT) is configured to provide stimuli perceivable as sound to the user in dependence of said processed signal (y).

The hearing instrument (HD) further comprises a sound scene classifier (SA) either working in the time domain, as shown in FIG. 4A, or, as shown in FIG. 4B, in the (time-) frequency domain). A sound scene may be defined with a particular value or range of values of a (e.g. frequency dependent) parameter of the electric input signal (x, X). A parameter of the electric input signal may comprise (or be derived from) its level. A parameter of the electric input signal may comprise (or be derived from) its signal-to-noise-ratio. A parameter of the electric input signal may comprise (or be derived from) its sound quality estimate, e.g. its signal-to-noise-ratio. A parameter of the electric input signal may comprise (or be derived from) an estimate of its speech intelligibility.

Sound scenes may e.g. be interpreted as different based on (or influenced by)

- two measured (or estimated) levels,
- two measured (or estimated) sound quality estimates, e.g. signal-to-noise-ratios, or
- two measured (or estimated) speech intelligibility estimates of the electric input signal.

The adaptation between different prototype filters may depend on a specific sound scene, e.g. a measured (or estimated) level, a measured (or estimated) SNR, a measured (or estimated) speech intelligibility estimate, a measured (or estimated) sound quality estimate, or a combination of the different parameters, e.g. expressed by a criterion containing one or more of said parameters.

A sound scene may also be estimated based on a (trained) sound scene classifier, e.g. as labeled sound scenes like traffic, babble, quiet, single talker, own voice, etc. The sound scenes may also be provided as un-labeled features. The sound scene classifier may run locally in each hearing instrument, it may be based on both hearing aids of a binaural hearing aid system, and/or be based on a sound scene classifier running on another device, such as a smartphone.

The hearing instrument (HD) further comprises a controller (CTR) configured to control the filter bank by applying different prototype filters to the analysis and synthesis filter banks in dependence of the current acoustic environment as classified by the sound scene classifier (SA), cf. output ($PFW_{SSC}$) of the SA-CTR unit, e.g. feeding appropriate prototype filter coefficients to the respective analysis (FBA) and synthesis (FBS) filter banks. In other words, the hearing device is configured to have access to a database (e.g. stored in memory of the hearing device) comprising a multitude of different first and second prototype filters, e.g. filter coefficients thereof, together with a classification (e.g. a sound class) of the acoustic environment (or environments) where these are intended to be applicable, e.g.:

h1(n), g1(n), Sound class1, h2(n), g2(n), Sound class2,

. . .

$h_Q(n)$, $g_Q(n)$, sound class Q.

where $h_q(n)$ and $g_q(n)$ represent first and second prototype filters of the analysis filter bank and the synthesis filter bank, respectively, for sound class q (acoustic environment #q). The number Q of sound classes having different prototype filters may e.g. be two or more, such as three or more, e.g. less than ten.

The prototype filters may depend on a hearing loss of the user. A prototype filter for a flat (across frequency) hearing loss may e.g. be configured to have less stopband attenuation and a narrower main lobe, whereas a prototype filter for a ski slope hearing loss (little loss at low frequency and high loss at high frequency) have more stop-band attenuation and a broader main lobe with more overlap between the neighboring bands.

It may thus make sense to individualize the prototype filters of the filter bank to a particular hearing loss even without changing the prototype filter across sound scenes (e.g. determined in a fitting session).

When a new (e.g. different from the previously detected) sound scene is detected, the controller (CTR) may be configured to (possibly instantly) fade from one prototype filter to another. Preferably the different adaptive prototype filters have the same group delay, such that the fading between the two filter banks maintain the same phase response (and the magnitude response changes are negligible). As only the prototype filter is changed, the frequency transformation in the filter banks (such as FFT or IFFT) can be re-used (cf. FIG. 3B).

The weights of a fixed beamformer may depend on the selected filter bank. Directional fixed beamformer weights may be changed depending on the selected prototype filter bank, see e.g. FIG. 7.

An adaptation rate of a feedback cancellation system may be temporarily increased when the filter banks are modified (i.e. when prototype filters are substituted).

A decision on changing the prototype filters may be applied to both hearing aids of a binaural hearing aid system simultaneously. The prototype filters may, however, be adapted on each hearing instrument separately.

FIG. 4B shows a second exemplary implementation of a hearing instrument with adaptive prototype analysis and synthesis filters. The embodiment of FIG. 4B is identical to the embodiment of FIG. 4A, apart from the scene detection unit (SA) receives the electric input signal (x) as (time-) frequency domain signals (X'). The embodiment of FIG. 4B comprises a specific analysis filter bank (FBA') providing the (time domain) electric input signal (x) as a multitude of time variant frequency band signals (X'), which are fed to the scene detection unit (SA). The prototype filter of the specific analysis filter bank (FBA') is not part of the adaptive adaptation to the acoustic environment (this is confined to the filter bank (FBA, FBS) of the forward audio path). The specific analysis filter bank (FBA') may be configured to provide the same or a different number of frequency subbands than the filter bank (FBA, FBS) of the forward audio path.

An advantage of providing the input to the scene detection unit in the frequency domain is that it may be easier to extract scene dependent features from the frequency domain signal rather than from the time domain signal. Also, a higher frequency resolution may be used for the scene detection compared to the frequency resolution in the signal path used to generate the audio output signal, as the scene detection unit may utilize a longer latency than what is allowed in the signal path. The output ($PFW_{SSC}$) of the SA-CTR unit is the same FIG. 4A to 4B. In both cases it provides/selects the appropriate prototype filter coefficients.

Figure 5:
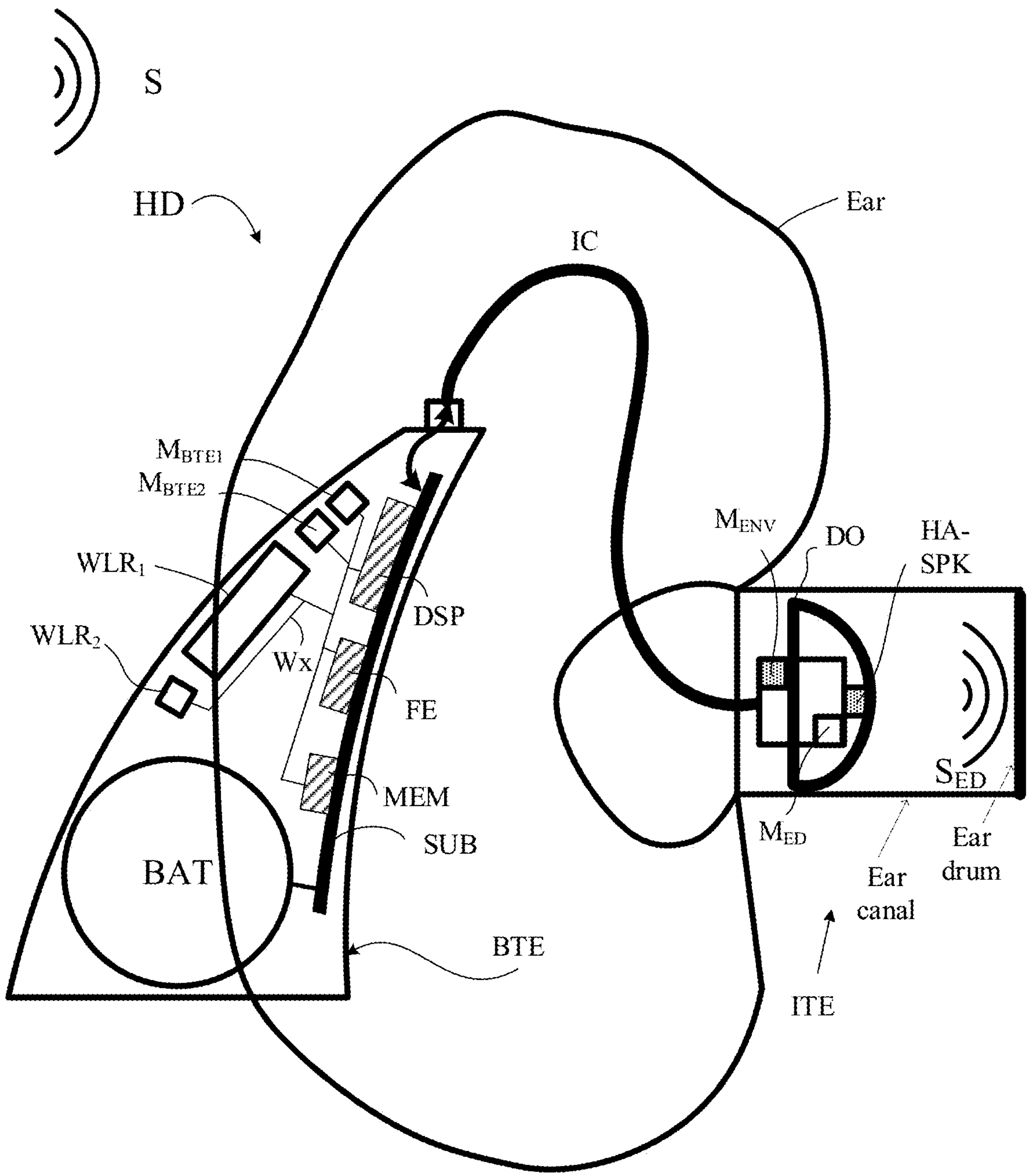
FIG. 5 shows a third exemplary hearing aid according to the present disclosure.

FIG. 5 shows an exemplary hearing aid according to the present disclosure. FIG. 5 shows an embodiment of a BTE-style hearing aid (HD) comprising an adaptive filter bank according to the present disclosure. The hearing device (HD) comprises a BTE-part and an ITE-part comprising an (possibly customized) ear mould or a more open dome-like structure (DO) or similar element e.g. for guiding the ITE-part in the ear canal of the user. The BTE-part (BTE) is adapted for being located at or behind an ear of a user, and the ITE-part (ITE) is adapted for being located in or at an ear canal of the user's ear. The ITE-part comprises a loudspeaker (HA-SPK) allowing sound to be played at the ear drum (Eardrum) of the user (cf. sound field $S_{ED}$). The BTE-part and the ITE-part are electrically connected by connecting element (IC, e.g. an electric cable IC). The BTE-part comprises first and second input transducers, e.g. microphones ($M_{BTE1}$ and $M_{BTE2}$), respectively, which are used to pick up sound from the environment of a user wearing the hearing device (cf. sound field S). The ITE-part may comprise an environment facing microphone ($M_{ENV}$), e.g. located at the entrance of the ear canal. The environment facing microphone has the advantage of picking up a signal that comprises the natural 'Pinna cues' reflecting the acoustic properties of Pinna. The ITE-part may further comprise an eardrum facing input transducer (MED, e.g. a microphone, or a vibration sensor) located so that it picks up sound or vibrations in or at the residual volume between the ITE-part and the ear drum (including from the speaker (HA-SPK) of the ITE-part) and provides an electric signal representative thereof. Such microphone may e.g. be used to various tasks for improving the processing of sound by the hearing aid, e.g. own voice detection or active noise cancellation (ANC). The connecting element (IC), e.g. an electric cable, is configured to comprise a multitude of electrically conducting wires or channels to allow the processor of the BTE part to communicate with the loudspeaker (HA-SPK), the environment facing microphone ($M_{ENV}$) and/or the eardrum facing microphone (MED, if present), and possible other electronic components of the ITE part (ITE). Further, the electric cable may also be configured to allow energising the electronic components of the ITE-part (as well as those of the BTE-part) from the battery (BAT) of the BTE-part. The conductors of the electric cable are (e.g. via matching electric connectors on the cable and the BTE-part) connected to internal wiring in the BTE-part (cf. e.g. schematically illustrated as wiring Wx in the BTE-part)

to relevant electronic circuitry of the hearing device, e.g. to the processor (DSP) and/or to a battery (BAT).

The hearing aid (HD) (here the BTE-part) further comprises two (e.g. individually selectable) wireless receivers ($WLR_1$, $WLR_2$) for providing respective directly received auxiliary audio input and/or control or information signals. The wireless receivers may be configured to receive signals from another hearing device (e.g. of a binaural hearing system) or from any other communication device, e.g. telephone, such as a smartphone, or from a wireless microphone or a T-coil. The wireless receivers may be capable of receiving (and possibly also of transmitting) audio and/or control or information signals. The wireless receivers may be based on Bluetooth or similar (short range communication) technology, e.g. UWB (Ultra Wide Band), or may be based on near-field communication (e.g. inductive coupling).

The hearing aid (HD) exemplified in FIG. 5 represents a portable device and further comprises a battery (BAT), e.g. a rechargeable battery, for energizing electronic components of the BTE-part and possibly the ITE-part.

The hearing aid (e.g. the processor (DSP)) may be adapted to provide a frequency dependent gain and/or a level dependent compression and/or a transposition (with or without frequency compression) of one or more frequency ranges to one or more other frequency ranges, e.g. to compensate for a hearing impairment of a user. The digital signal processor (DSP) may e.g. comprise appropriate filter banks (e.g. analysis as well as synthesis filter banks according to the present disclosure) to allow processing in the frequency domain (individual processing of frequency sub-band signals). The digital signal processor (DSP) may—as appropriate—comprise analogue to digital and digital to analogue converters (or a digital to digital) converters, for conversion of an analogue input signal and a processed (digital electric) signal to an analogue electric signal, respectively.

The BTE-part comprises a substrate SUB whereon a number of electronic components (MEM, FE, DSP) are mounted. The BTE-part comprises a configurable signal processor (DSP) and memory (MEM) accessible therefrom. The memory (MEM) may e.g. comprise filter coefficients for a multitude of different prototype filters of a filter bank according to the present disclosure, the prototype filters being configured for use in a corresponding multitude of different acoustic environments. In an embodiment, the signal processor (DSP) form part of an integrated circuit, e.g. a (mainly) digital integrated circuit. The BTE-part, e.g. the substrate, further comprises (mainly analogue) frontend-circuitry (FE) and radio-chips ($WLR_1$, $WLR_2$) as appropriate.

The partition of functional tasks between the BTE-part and the ITE-part may be different from the one mentioned in connection with the embodiments of FIG. 5. Some of the processing of the BTE-part and/or the ITE-part may be located in a dedicated processing device in communication with the BTE-part and/or the ITE-part, for example the processing related to the sound scene classification (cf. e.g. scene detection unit (SA) in FIG. 4A, 4B).

Figure 6:
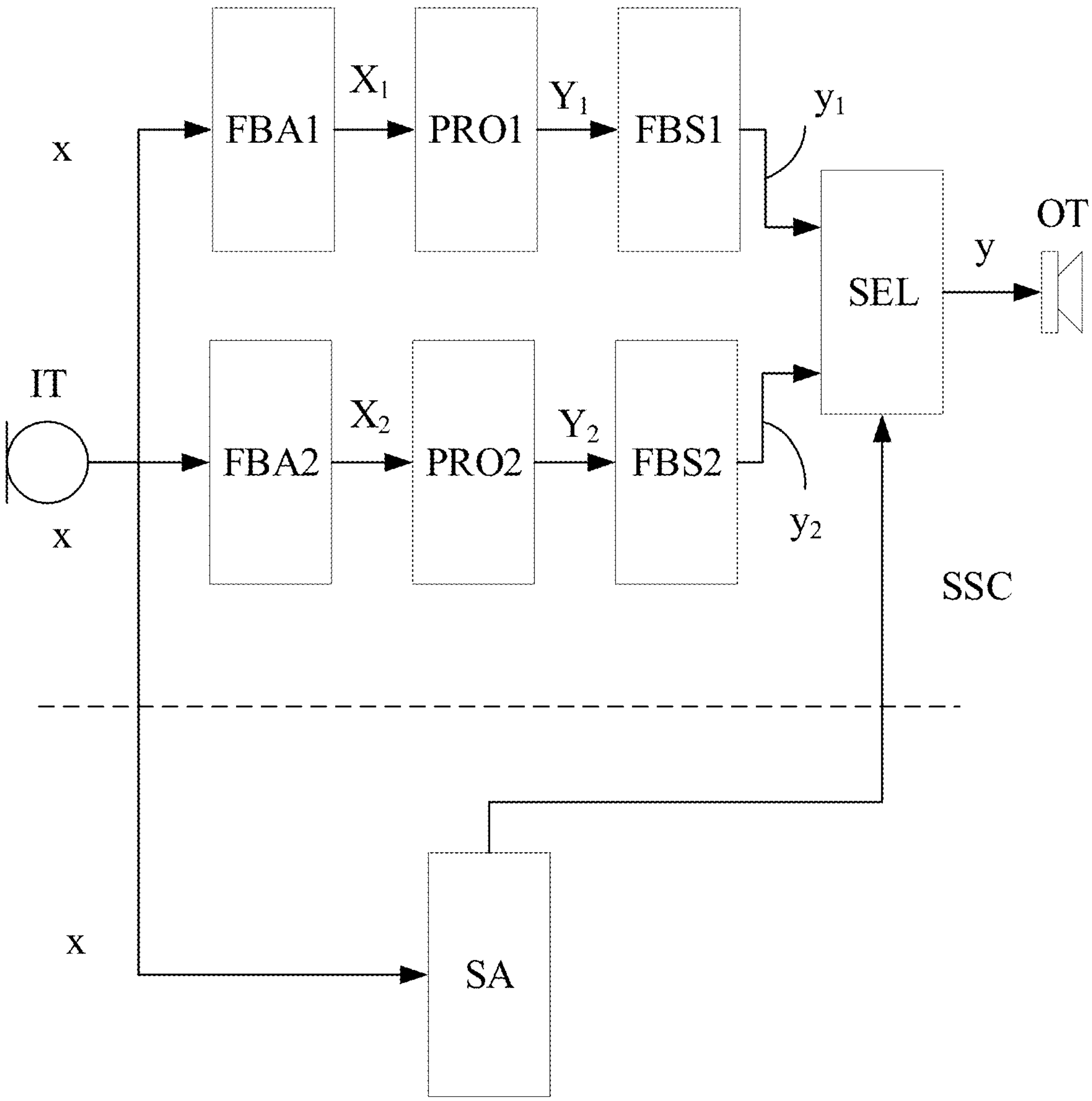
FIG. 6 shows a fourth exemplary hearing aid according to the present disclosure.

FIG. 6 shows a fourth exemplary hearing aid according to the present disclosure. The embodiment of FIG. 6 builds on the embodiment of FIG. 4A, comprising a (first) forward path comprising an input transducer (IT) (here a microphone) proving a time domain electric input signal (x) comprising audio, a (first) analysis filter bank (FBA1) for converting the time domain signal (x) to a (first) time-frequency signal ($X_1$), a (first) processing unit (PRO1) for processing the (first) frequency sub-band signals ($X_1$) to (first) processed frequency sub-band signals ($Y_1$), a (first) synthesis filter bank (FBS1) for converting the (first) frequency sub-band signals ($Y_1$) to a (first) processed time domain signal ($y_1$), and an output transducer (OT) (here a loudspeaker) for converting a resulting time-domain output signal (y) to stimuli perceivable by the user as sound. The hearing device of FIG. 6 further comprises a second processing path connected between said input transducer (IT) and said output transducer (OT). The second processing path comprises a (second) analysis filter bank (FB2) providing a (second) time-frequency signal ($X_2$), a (second) processing unit (PRO2) for processing the (second) frequency sub-band signals ($X_2$) to (second) processed frequency sub-band signals ($Y_2$), and a (second) synthesis filter bank (FBS2) for converting the (second) frequency sub-band signals ($Y_2$) to a (second) processed time domain signal ($y_2$). The outputs ($y_1$, $y_2$) of the respective first and second synthesis filter banks (FBS1, FBS2) are connected to a selector (SEL) for selecting one of the output streams ($y_1$, $y_2$) and presenting the selected (resulting) output stream (y) to the user via the output transducer (OT). The selector (SEL) is controlled in dependence of a currently determined (or selected) acoustic environment, cf. sound scene control signal (SSC), here provided by sound scene classifier (SA) in dependence of the electric into signal from the input transducer (IT). Instead of being located between the first and second synthesis filter banks (FBS1, FBS2) and the output transducer (OT), the selector (SEL) may be placed before ('upstream of') the synthesis filter banks, in which case we only need on synthesis filter bank. In the embodiment shown in FIG. 6, the two synthesis filter banks (FBS1, FBS2) may share the same synthesis filter bank coefficients (e.g. prototype filter coefficients).

An advantage of the proposed solution is that it allows different processing for at least two types of sound scenes, e.g. quiet and noisy. A fast switching of parameters from one scene to another may thereby by provided. Also, other parameters than the filter banks may be set in different ways depending on the at least two sound scenes. E.g. aggressiveness of the noise reduction system, beamformer weights, or smoothing time constants.

Figure 7:
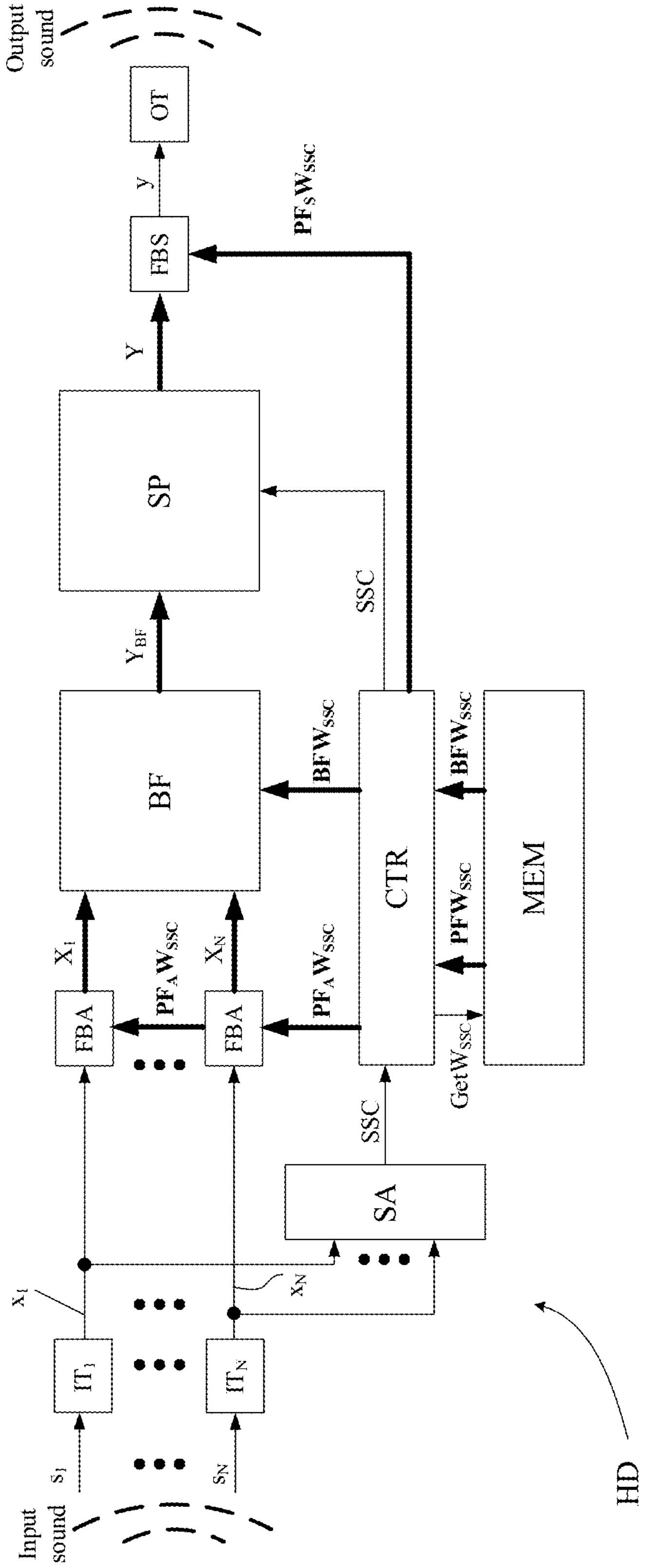
FIG. 7 shows a fourth exemplary hearing aid according to the present disclosure comprising beamformer.

FIG. 7 shows a fourth exemplary hearing aid according to the present disclosure comprising beamformer. The embodiment of a hearing aid shown in FIG. 7 resembles the embodiment described in connection with FIG. 4A. The differences are described in the following. Instead of one input transducer shown in FIG. 4A, the embodiment of FIG. 7 comprises a multimode of N input transducers ($IT_1$, . . . , $IT_N$), e.g. microphones, each providing a (digitized electric input signal ($x_1$, i=1, . . . , N) in the time domain from 'Input sound' (s1, . . . , $s_N$) at the respective input transducers. Hence, the embodiment of FIG. 7 also comprises a multimode of N analysis filter banks (FBA), each providing respective frequency sub-band signals ($X_i$, i=1, . . . , N). The hearing aid of FIG. 7 further comprises a beamformer (BF) connected to the multitude N of electric input signals ($X_1$, . . . , $X_N$) and configured to provide a beamformed signal $Y_{BF}$ in dependence of the N electric input signals and predefined (and/or adaptively updated) beamformer weights (BFW). The beamformer weights are adapted in dependence of the currently selected prototype filter of the filter bank (e.g. the analysis filter banks FBA)). The beamformed signal is fed to a signal processing unit (SP) for applying one or more processing algorithms to the beamformed signal (e.g. noise reduction (postfiltering), compressive amplification to compensate for a user's hearing impairment, etc.). The signal processing unit (SP) provides a processed signal Y in the time-frequency domain (as frequency sub-band signals). As in the embodiment of FIG. 4A, the processed signal Y is fed to an adaptive synthesis filter bank according to the present disclosure converting the processed signal Y to a corresponding time domain signal y, which is converted to stimuli perceivable as sound to the user by output transducer (OT), e.g. a loudspeaker or a vibrator providing 'Output sound'.

The embodiment of FIG. 7 further comprises a sound scene classifier (SA) as described in connection with FIG. 4A, 4B, only her it receives N electric (time domain) input signals ($x_i$, i=1, . . . , N)). Based thereon, the sound scene classifier (SA) provides a sound scene class control signal (SSC) indicative of a current acoustic environment. The hearing aid further comprises a controller for controlling the analysis filter banks (FBA) and the synthesis filter bank (FBS) by applying different first and second prototype filters to said at M analysis filter banks (FBA) and to the synthesis filter bank (FBS), respectively, in dependence of the sound scene class control signal (SSC) (indicative of a current acoustic environment). The hearing aid (HD) comprises a database of corresponding first and second prototype filters ($h_q$(n), $g_q$(n) and Sound Scene Class $SSC_q$, q=1, . . . , Q), e.g. stored in memory (MEM) accessible to the controller (CTR). In response to a change in the currently determined Sound Scene Class (SSC), the controller (CTR) reads (cf. signal $GetW_{SSC}$) the filter coefficients of the first ($PF_SW_{SSC}$) and second ($PF_SW_{SSC}$) prototype filters (for the analysis and synthesis filter banks, respectively) corresponding to the current Sound Scene Class. Thereby the filter coefficients of the first ($PF_SW_{SSC}$) and second ($PF_AW_{SSC}$) prototype filters are retrieved and forwarded to the respective analysis filter banks (FB) and the synthesis filter bank (FBS) (cf. bold arrows $PF_AW_{SSC}$ to the M analysis filter banks (FBA) and $PF_SW_{SSC}$ to the synthesis filter bank (FBS)). Further, different beamformer weights ($BFW_{SSC}$) associated with at least some of the Sound Scene Class $SSC_q$, q=1, . . . , Q, are also stored in memory (MEM). The weights of a fixed beamformer may depend on the selected prototype filter(s) of the filter bank. Fixed beamformer weights of the beamformer (BF) may be changed depending on the selected prototype filter of the filter bank.

The beamformer weights ($BFW_{SSC}$) may be adapted in dependence of a current acoustic environment as described for the prototype filters of the adaptive filter bank: In response to a change in the currently determined Sound Scene Class (SSC), the controller (CTR) reads (cf. signal $GetW_{SSC}$) the beamformer weights ($BFW_{SSC}$) stored in memory corresponding to the current Sound Scene Class (SSC)/filter bank prototype filter. Thereby beamformer weights ($BFW_{SSC}$) associated with the current prototype filters of the filter bank (and thus the current acoustic environment) are retrieved and forwarded to the beamformer (BF) for application instead of the previous beamformer weights (cf. bold arrow $BFW_{SSC}$ to the beamformer (BF)).

The currently determined Sound Scene Class (SSC) may be forwarded by the controller (CTR) to the signal processing unit (SSC), e.g. for use in one or more processing algorithms (e,g, noise reduction and/or level compression/gain estimation).

One or more, such as all of the sound scene classifier (SA), the controller (CTR), and the memory (MEM) may be located in another device than the hearing device, e.g. in an auxiliary device (cf. e.g. FIG. 8A, 8B), e.g. a dedicated processing device or a smartphone or remote control device. In such case the hearing aids and the auxiliary device must comprise appropriate transceiver circuitry to allow communication links with appropriate bandwidth and (low) latency to be stablished between the devices, FIG. 8A shows a hearing system comprising a hearing aid and an auxiliary device in communication with each other.

Figure 8A:
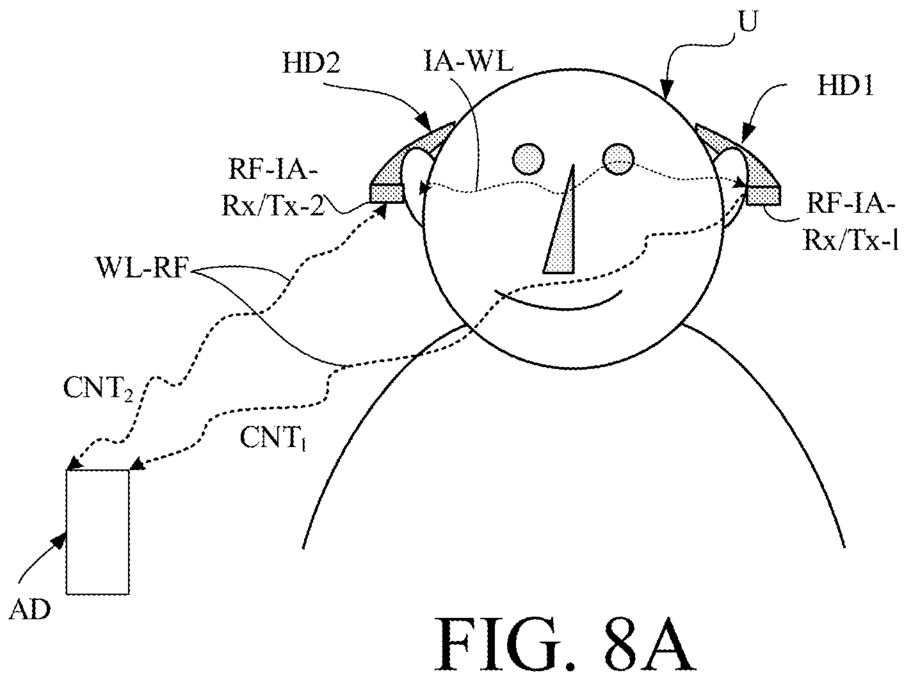
FIG. 8A shows a hearing system comprising a hearing aid and an auxiliary device in communication with each other.
Figure 8B:
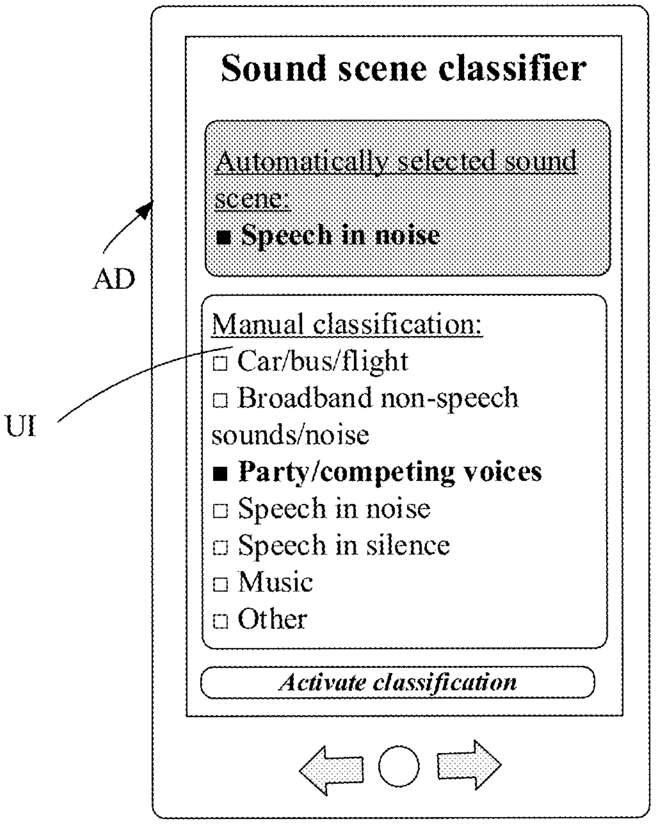
FIG. 8B shows the auxiliary device of FIG. 8A configured to implement a user interface for the hearing aid by running an application program from which a mode of operation of the hearing aid can be selected.

FIG. 8B shows the auxiliary device of FIG. 8A configured to implement a user interface for the hearing aid by running an application program from which a mode of operation of the hearing aid can be selected.

FIGS. 8A and 8B together illustrate an exemplary application scenario of an embodiment of a hearing system (HD1, HD2, AD) according to the present disclosure.

FIG. 8A shows a hearing system comprising a hearing device (HD1, HD2), e.g. a hearing aid, and an auxiliary device (AD) in communication with each other. FIG. 8A shows an embodiment of a head-worn binaural hearing system comprising left and right hearing devices (HD1, HD2) in communication with each other and with a portable (handheld) auxiliary device (AD) functioning as a user interface (UI) for the binaural hearing aid system (see FIG. 8B). The binaural hearing system may comprise the auxiliary device AD (and the user interface UI). The binaural hearing system may comprise the left and right hearing devices (HD1, HD2) and be connectable to (but not include) the auxiliary device (AD). In the embodiment of FIG. 8A, the hearing devices (HD1, HD2) and the auxiliary device (AD) are configured to establish wireless links (WL-RF) between them, e.g. in the form of digital transmission links according to the Bluetooth standard (e.g. Bluetooth Low Energy, Ultra-Wideband (UWB), or equivalent technology). The links may alternatively be implemented in any other convenient wireless and/or wired manner, and according to any appropriate modulation type or transmission standard, possibly different for different audio sources.

The hearing devices (HD1, HD2) are shown in FIG. 8A as devices mounted at the ear (behind the ear) of a user (U). Other styles may be used, e.g. located completely in the ear (e.g. in the ear canal), fully or partly implanted in the head, etc. As indicated in FIG. 8A, each of the hearing devices may comprise a wireless transceiver to establish an interaural wireless link (IA-WL) between the hearing devices, e.g. based on inductive communication or RF communication (e.g. Bluetooth technology). Each of the hearing devices further comprises a transceiver for establishing a wireless link (WL-RF, e.g. based on radiated fields (RF)) to the auxiliary device (AD), at least for receiving and/or transmitting signals, e.g. control signals, e.g. information signals, e.g. including audio signals. The transceivers are indicated by RF-IA-Rx/Tx-2 and RF-IA-Rx/Tx-1 in the right (HD2) and left (HD1) hearing devices, respectively. The remote control-APP may be configured to interact with a single hearing device (instead of with a binaural hearing system, as illustrated in FIG. 8A).

The auxiliary device (AD) is adapted to run an application program, termed an APP, comprising executable instructions configured to be executed on the auxiliary device (e.g. a smartphone) to implement a user interface for the hearing device (or hearing system). The APP is configured to exchange data with the hearing device(s). FIG. 8B shows the auxiliary device (AD) of FIG. 8A configured to implement a user interface for the hearing device(s) (HD1, HD2) by running an application program from which a mode of operation of the hearing aid can be selected and via which selectable options for the user, and/or current status information can be displayed.

FIG. 8B illustrates the auxiliary device running an APP for configuring features of sound scene classification in the user's hearing aid or hearing aid system for use in an adaptive filter bank according to the present disclosure. An exemplary (configuration) screen of the user interface UI of the auxiliary device AD is shown in FIG. 8B. The user interface (UI) comprises a display (e.g. a touch sensitive display) displaying options for the user to manually set a sound scene class of the hearing aid or hearing aid system. The user interface (UI) is implemented as an APP on the auxiliary device (AD, e.g. a smartphone). The APP is denoted 'Sound scene classifier'. Via the display of the user interface, the user (U) can accept an 'Automatically detected sound scene' (e.g. provided by sound scene classifier (SA), cf. e.g. FIG. 4A, 4B, 6, 7), cf. grey shaded box at the top of the screen. In the example, the automatically detected sound scene is 'Speech in noise'. This can be accepted by pressing the solid black tick box (■) in front of the automatically detected sound scene, and subsequently pressing the button 'Activate classification' at the bottom of the screen. Alternatively, the user is able to manually override the automatically detected sound scene, cf. the lower box denoted 'Manual classification', wherein a number of manually selectable sound scene classifications are listed (for which different prototype filters for the filter bank are available). The classification options for manual selection are:

Car/bus/flight
Broadband non-speech sounds/noise
Party/competing voices
Speech in noise
Speech in silence
Music
Other If the user wants to override the (default) automatically provided sound scene class, the tick box of the relevant class should be pressed (as indicated above and in the exemplary screen of the APP in FIG. 8B, Tarty/competing voices' has been selected as indicated by solid tick box (■) and bold face letters). Subsequently the button 'Activate classification' at the bottom of the screen should be pressed.

The current acoustic environment may be automatically detected/classified by the hearing device(s) and/or by the auxiliary device (e.g. using acoustic features extracted from the electric input signals of the hearing device(s), and/or microphones and other sensors of the auxiliary device).

Further screens of the APP may allow the user to control other features of the hearing aid or hearing aid system, volume setting, program shift, monaural or binaural configuration, etc.

Switching between different screens of the APP may be achieved via left and right arrows in the bottom of the auxiliary device, or via 'soft buttons' integrated in the display of the user interface (UI).

In the embodiment of FIG. 8A, 8B, the auxiliary device (AD) is described as a smartphone. The auxiliary device may, however, be embodied in other portable electronic devices, e.g. an FM-transmitter, a dedicated remote control-device, a smartwatch, a tablet computer, etc.

In case of a binaural hearing aid system comprising first and second hearing aids in communication with each other, the two hearing aids may change prototype filters simultaneously based on a joint decision. Or the two hearing instruments may comprise different prototype filter coefficients. E.g. in asymmetric situations, where the noise level is much higher at on ear compared to the other ear. Also, if the hearing instrument user has asymmetric hearing loss, the listener may benefit between switching between different sets of prototype filters on one hearing instrument and another different set of prototype filter at the other hearing instrument.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

REFERENCES

US20170295438A1 (Oticon) Dec. 10, 2017
[Vaidyanathan; 1993] Vaidyanathan, P. P. "Multirate systems and filter banks." (1993)

The invention claimed is:

1. A hearing device, e.g. a hearing aid or a headset, comprising at least one input transducer configured to pick up sound from an acoustic environment around the user when the user is wearing the hearing device, the at least one input transducer providing at least one electric input signal representative of said sound, at least one analysis filter bank configured to provide said at least one electric input signal as a multitude of frequency sub-band signals, the at least one analysis filter bank comprising a plurality of M first filters $h_m(n)$, whose impulse responses are modulated from a first prototype filter h (n), where m=0, 1, . . . , M−1 is a frequency band index, and n is a time index, a processor for processing said at least one electric input signal provided by said at least one analysis filter bank, or a signal originating therefrom, and providing a processed signal, an output transducer configured to provide stimuli perceivable as sound to the user in dependence of said processed signal, and a controller for controlling said analysis filter bank by applying a different first prototype filter to said at least one analysis filter bank in dependence of said current acoustic environment, and wherein the different prototype filters are configured to exhibit the same group delay.

2. A hearing device according to claim 1 comprising a sound scene classifier configured to classify said acoustic environment into a number of different sound scene classes, and to provide a current sound scene class in dependence of a current representation, of said at least one electric input signal.

3. A hearing device according to claim 2 wherein the sound scene classifier comprises a neural network.

4. A hearing device according to claim 2 wherein the sound scene classifier receives the at least one electric input signal as input.

5. A hearing device according to claim 2 wherein the sound scene classifier receives frequency domain input features, or a combination of time and frequency domain input features, extracted from said at least one electric input signal.

6. A hearing device according to claim 2 comprising a user interface allowing a user to influence functionality of the hearing device, including to allow the user to indicate the current acoustic environment, or by selection of a specific program, wherein each selected acoustic environment or program is associated with a specific prototype filter.

7. A hearing device according to claim 2 wherein the controller is configured to provide that a fading from one prototype filter to another is initiated when said sound scene classifier or said user changes its classification of the current acoustic environment from one sound scene class to another, wherein such that the fading between the two filter banks maintains the same phase response.

8. A hearing device according to claim 2 wherein fading from one prototype filter to another is provided under the constraint that the two prototype filters have the same group delay.

9. A hearing device according to claim 8 wherein a fading time is greater than 1 second, such as greater than 5 seconds, or greater than 10 seconds.

10. The hearing device according to claim 1 configured to allow a prototype filter of the filter bank to be changed in dependence of a detected acoustic scene.

11. A hearing device according to claim 1 comprising at least two input transducers configured to pick up sound from an acoustic environment around the user when the user is wearing the hearing device, the at least two input transducers providing at least two electric input signals representative of said sound, a beamformer configured to provide beamformed signal in dependence of said at least two electric input signals and predefined and/or adaptively updated beamformer weights, wherein the beamformer weights are adapted in dependence of the selected prototype filter.

12. A hearing device according to claim 1 comprising an adaptive feedback control system comprising an adaptive algorithm for estimating a feedback path from said output transducer to said at least one input transducer, and wherein the hearing device is configured to control the adaptation rate of the adaptive algorithm in dependence of a change of the current acoustic environment.

13. A hearing device according to claim 12 wherein an adaptation rate of the feedback control system is temporarily increased when the different first prototype filter is applied in the analysis filter bank.

14. A hearing device according to claim 1 configured to provide that at least one of said prototype filters is dependent on a hearing loss of the user.

15. A hearing device according to claim 2 configured to provide that a specific sound scene is dependent on a measured sound level, a measured signal-to-noise ratio, a measured speech intelligibility estimate, a measured sound quality estimate, or a combination thereof.

16. A hearing device according to claim 1 adapted for being located at or in an ear of a user, or for being at least partially implanted in the head at an ear of the user.

17. A hearing device according to claim 1 being constituted by or comprising an air-conduction type hearing aid, a bone-conduction type hearing aid, a cochlear implant type hearing aid, or a combination thereof.

18. A binaural hearing system comprising first and second hearing devices according to claim 1 wherein the hearing system is configured to change the prototype filters of the first and second hearing aids of the binaural hearing aid system simultaneously.

19. A binaural hearing system according to claim 18 wherein the prototype filters are adapted on each of the first and second hearing devices separately.

20. A method of operating a hearing device, e.g. a hearing aid, adapted for being located at or in an ear of a user, or for being at least partially implanted in the head at an ear of the user, the method comprising providing at least one electric input signal representative of sound from an acoustic environment around the user when the user is wearing the hearing device, providing said at least one electric input signal as a multitude of frequency sub-band signals, using a plurality of M first filters $h_m$ (n), where m=0, 1, . . . , M−1 is a frequency band index, and whose impulse responses are modulated from a first prototype filter h (n), n being a time index, processing said at least one electric input signal, or a signal originating therefrom, and providing a processed signal, providing stimuli perceivable as sound to the user in dependence of said processed signal, and wherein the step of providing said at least one electric input signal as a multitude of frequency sub-band signals comprises applying a different first prototype filter in dependence of said current acoustic environment, wherein the different prototype filters are configured to exhibit the same group delay.

* * * * *